United States Patent [19]
Plant et al.

[11] Patent Number: 5,096,358
[45] Date of Patent: Mar. 17, 1992

[54] METHOD AND APPARATUS FOR REMOVING A DISABLED AUTOMATIC GUIDED VEHICLE FROM AN ELEVATOR

[75] Inventors: William J. Plant, Hatfield; David W. Dagger, Souderton; Thomas G. Abrams, Bradford; Cynthia J. Quire, Saylorsburg, all of Pa.

[73] Assignee: FMC Corporation, Chicago, Ill.

[21] Appl. No.: 585,336

[22] Filed: Sep. 19, 1990

[51] Int. Cl.⁵ .............................................. B65G 67/02
[52] U.S. Cl. .................................. 414/347; 280/43.12; 414/458; 414/495; 414/500; 414/538
[58] Field of Search .............. 414/458, 459, 495, 498, 414/500, 537, 538, 785, 786, 341, 343, 347, 592, 609; 280/43.12

[56] References Cited

U.S. PATENT DOCUMENTS

| | | | |
|---|---|---|---|
| 2,215,529 | 9/1940 | Nazarko | 414/498 X |
| 3,547,288 | 12/1970 | Butler et al. | 414/458 X |
| 4,077,535 | 3/1978 | Oriol | 414/498 |
| 4,551,059 | 11/1985 | Petoia | 414/459 |
| 4,822,069 | 4/1989 | Burgess | 414/537 X |
| 4,884,936 | 12/1989 | Kawada | 280/43.12 X |
| 4,900,215 | 2/1990 | Nowell | 414/458 X |
| 4,921,264 | 5/1990 | Duffy | 414/458 X |
| 4,925,357 | 5/1990 | Cisternino et al. | 414/495 |

FOREIGN PATENT DOCUMENTS

| | | | |
|---|---|---|---|
| 3640770 | 6/1988 | Fed. Rep. of Germany | 414/459 |
| 161634 | 6/1987 | Japan | 414/459 |
| 861766 | 2/1961 | United Kingdom | 414/458 |

Primary Examiner—David A. Bucci
Attorney, Agent, or Firm—J. Preston Oxenham; Richard B. Megley

[57] ABSTRACT

An apparatus for rescuing an automatic guided vehicle comprises a pallet lift including a lift body, wheels for a rolling upon a supporting surface, and first and second elongate lift rails extending horizontally forward from the lift body and set apart a distance to allow the rails to embrace an automatic guided vehicle therebetween. First and second lifting tabs extend inward from each of the lift rails and include upper support surfaces for lifting the base of an automatic guided vehicle which lie beneath support surfaces of the first and second rail by a distance greater than a distance and the base of the automatic guided vehicle lies beneath a wheel of a cart being carried piggyback by the automatic guided vehicle. A method of rescuing an automatic guided vehicle and a piggyback cart from an elevator includes rolling the pallet lift onto the elevator to a position in which the automatic guided vehicle is between the lift rails and the rails are beneath the wheels of the cart. The rails are then lifted to an elevation at which the wheels are supported by an upper surface of the rails and the pallet lift is rolled off the elevator to transport the cart from the elevator and from above the automatic guided vehicle.

8 Claims, 5 Drawing Sheets

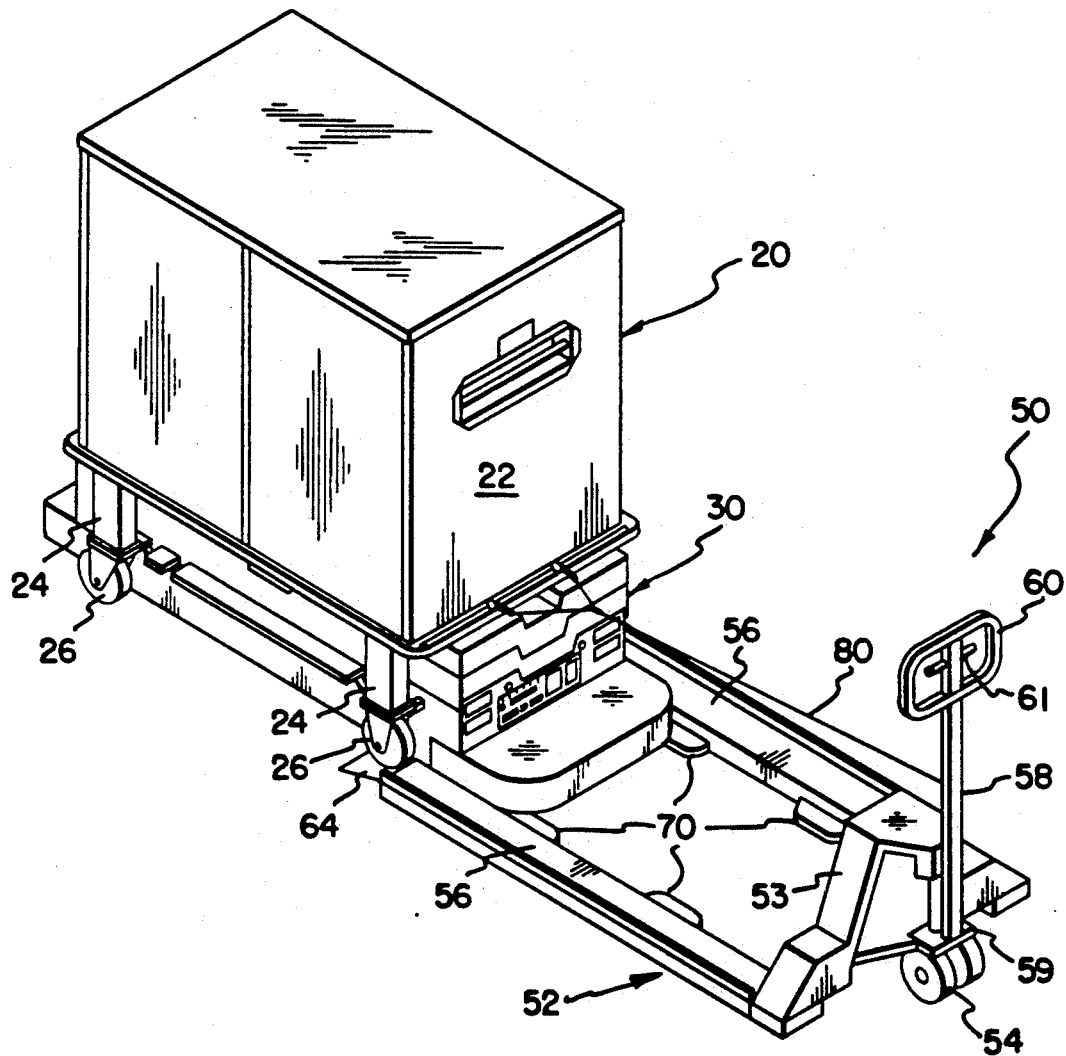
FIG_1

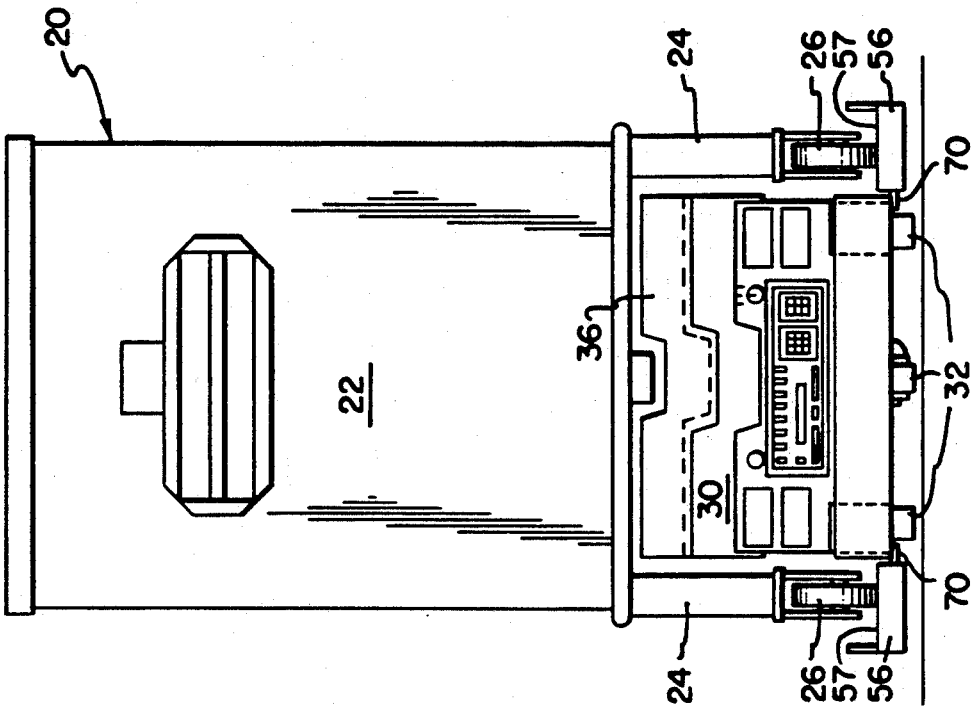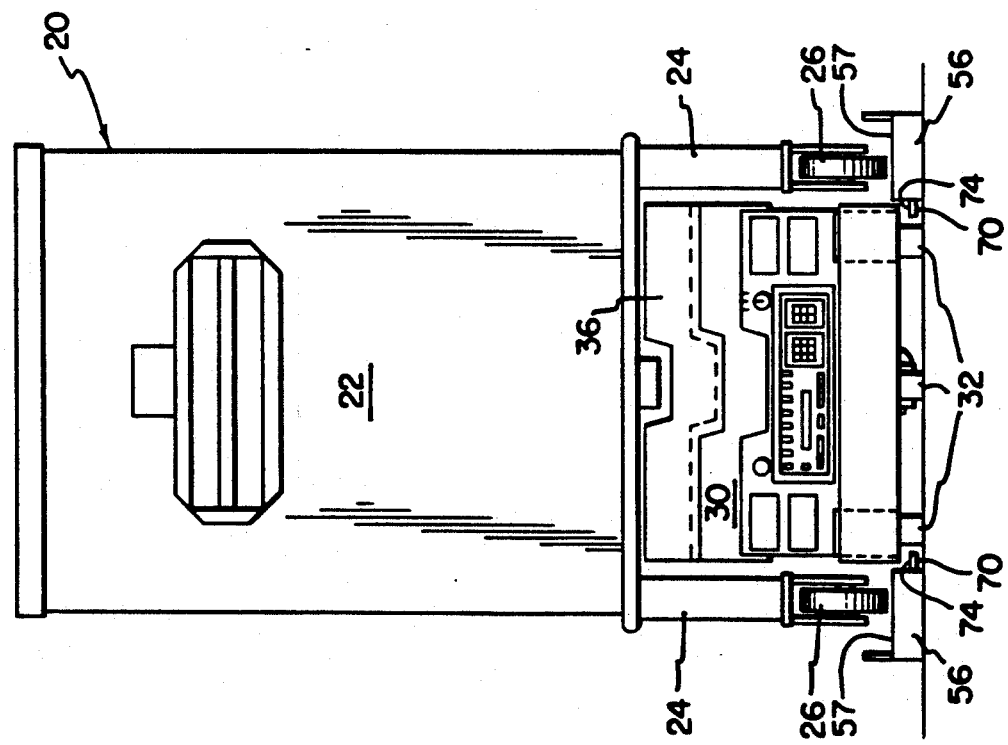

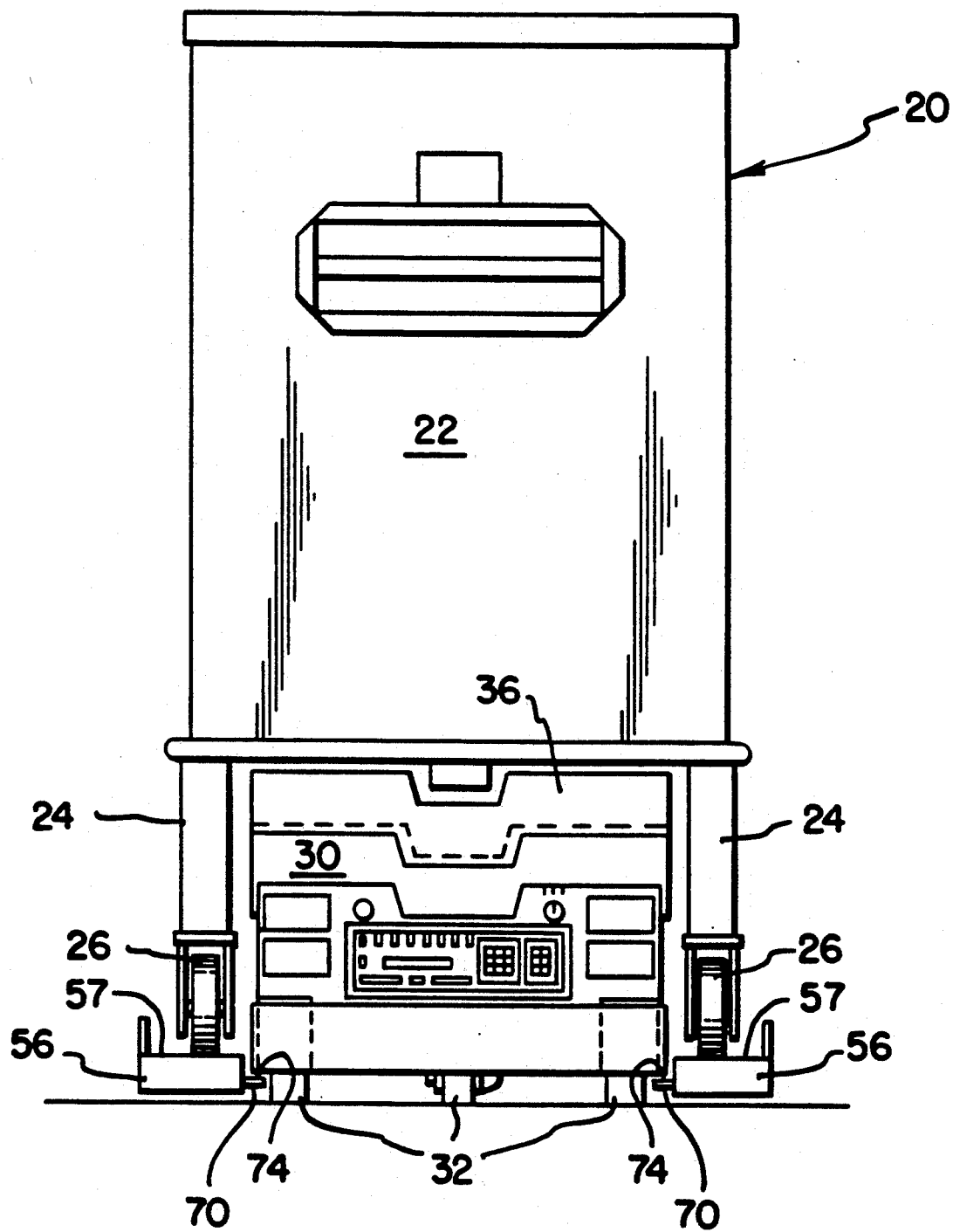
FIG_4

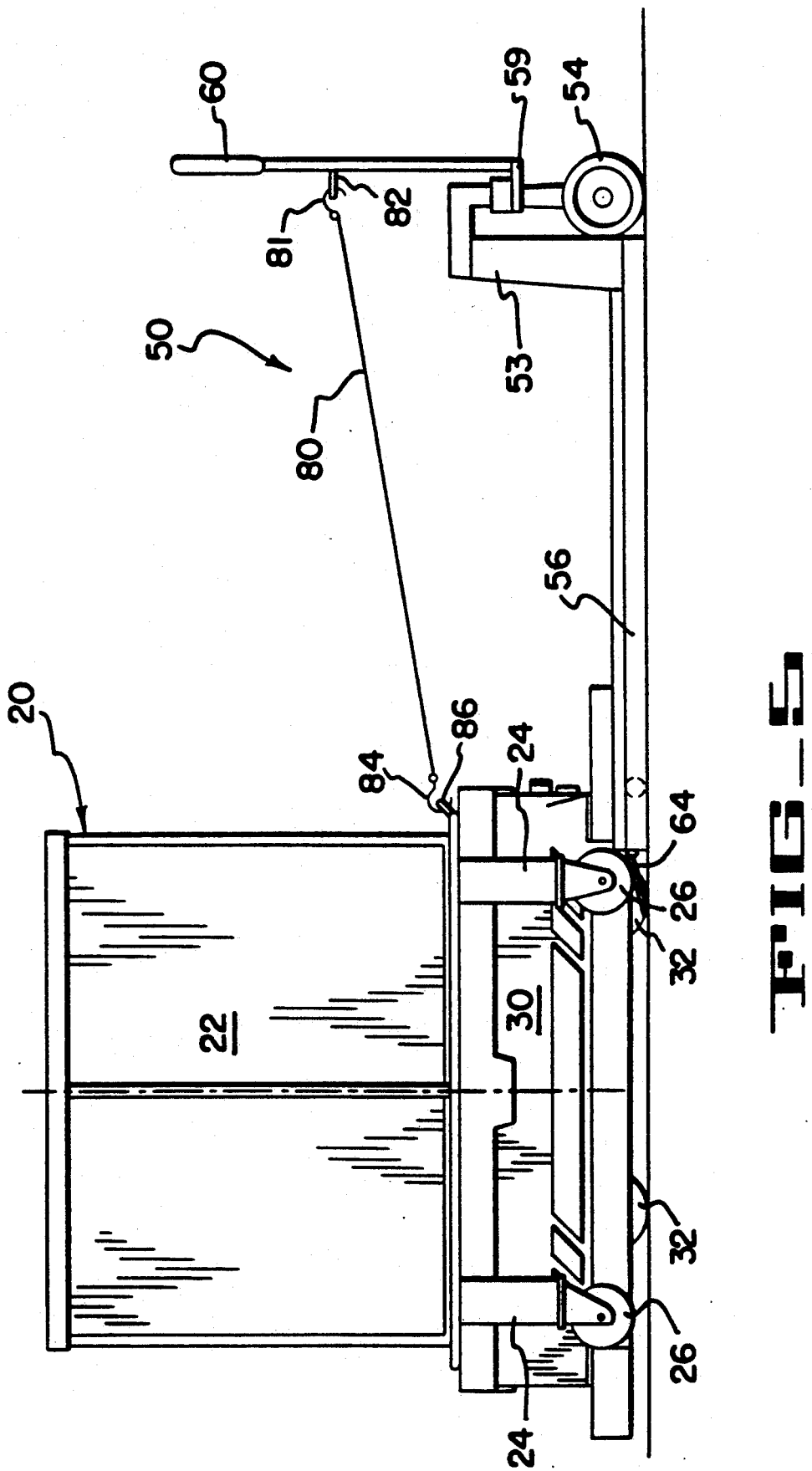
FIG_5

FIG_6 A
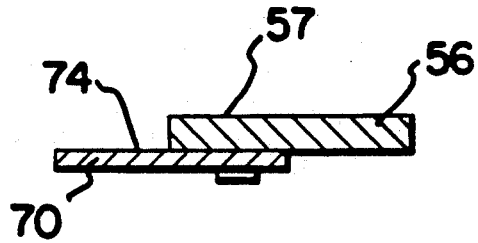
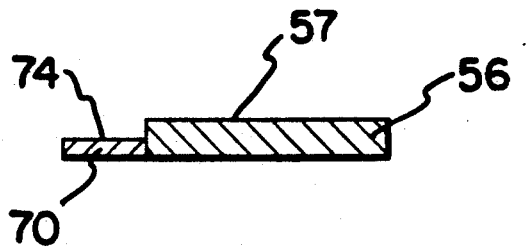
FIG. 6 B
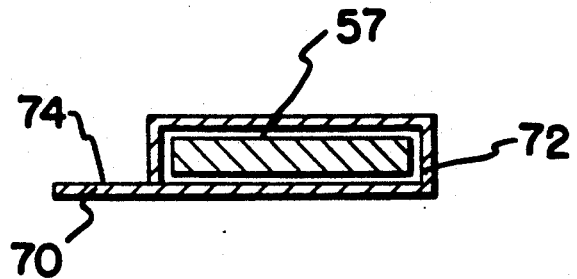
FIG. 6 C

METHOD AND APPARATUS FOR REMOVING A DISABLED AUTOMATIC GUIDED VEHICLE FROM AN ELEVATOR

TECHNICAL FIELD

The present invention relates to automatic guided vehicles and more particularly, to automatic guided vehicles utilized in material handling systems and which must be transported from floor to floor in multistory buildings. Most particularly the present invention relates to such vehicles which are adapted to transport material and supply carts in a piggyback manner.

BACKGROUND OF THE INVENTION

Material handling systems used in hospitals and industrial buildings may utilize automatic guided vehicles to transport material and supply carts from location to location within the building. In the case of multistory structures, these vehicles may have to be transported by elevators between different levels of the building. Particularly in the case of medical facilities, certain elevators may be dedicated solely to transport of these vehicles between floors. Where buildings were designed to accommodate such material handling systems which include dedicated elevators, the elevators are sized as small as possible, while allowing accommodation of the automatic guided vehicle together with a material and supply cart, to minimize floor area and building volume sacrificed to accommodate the elevator shafts. When an automatic guided vehicle experiences a power or other system failures while being transported from floor to floor on an elevator, it may become stranded in the elevator. In such circumstances, removal of the vehicle can be very difficult because of the lack of space about the vehicle in the elevator in which to work in effecting a rescue.

DISCLOSURE OF THE INVENTION

It is an object of the present invention to provide an effective means of rescuing a disabled automatic guided vehicle from an elevator.

It is a further object of the present invention to provide a means of rescuing an automatic guided vehicle from an elevator together with a material and supply cart which was being transported piggyback by the vehicle at the time it became disabled.

It is a further object of the present invention to provide for the rescue of a material and supply cart being transported piggyback by the automatic guided vehicle at the time it became disabled without necessity of recovering the cart and vehicle as a unit.

It is also an object of the present invention to provide a means for removing, first, a material and supply cart which is being transport piggyback by an automatic guided vehicle at the time it became disabled and, subsequently, remove the automatic guided vehicle from the elevator.

A preferred embodiment of rescue apparatus comprising a preferred embodiment of the present invention is intended for use in rescuing automatic guided vehicles which are utilized in material handling systems to transport material and supply carts from point-to-point in a piggyback manner. The carts have material and supply cabinets which are supported above a support surface by support legs with wheels at their base ends. The automatic guided vehicles are sized and adapted to fit closely between the legs, beneath the cabinets of the carts. The automatic guided vehicle is equipped with a lift platform at its upper surface which, once the automatic guided vehicle is positioned beneath the cabinet of the cart, is raised to contact the bottom of the cabinet and lift the cart from the supporting surface when the cart is to be transported by the automatic guided vehicle.

A preferred embodiment of the present invention comprises a wheeled forked-type pallet lift with two elongate parallel lift rails extending horizontally forward from a lift body. The lift rails have upper support surfaces and may be raised and lowered, together with a load supported by them, by a jacking device. The lift rails are set apart horizontally by such a distance that an automatic guided vehicle can just fit between them. Automatic guided vehicle lift tabs are provided on each of the lift rails and extend inward a sufficient distance to protrude beneath the base of an automatic vehicle when the rails are in a lowered position and embracing the automatic guided vehicle. The tabs are arranged such that an upper support surface of the tabs is located below the lifting surface of the rails by a distance greater than the distance by which the base of the automatic guided vehicle lies beneath the wheels of a material and supply cart when the cart is being transported piggyback by the automatic guided vehicle. Thus, with the lift rails lowered, the forklift may be maneuvered into position to embrace the automatic guided vehicle with the lift rails beneath the wheels of a cart resting "piggyback" on the automatic guided vehicle lift platform, and the lift rails raised to lift first the cart by contact of the rail support surfaces with the cart wheels and then the automatic guided vehicle by contact of the support surfaces of the lifting tabs with the base of the vehicle.

In use, during a rescue of an automatic guided vehicle from an elevator, the rescue apparatus is rolled into the elevator with the lift rails in a lowered position and embracing the automatic guided vehicle. The rails are then raised to an elevation at which the wheels of the material and supply cart are supported by the upper support surface of the rails but the upper support surface of the tabs are clear of the base of the automatic guided vehicle. The rescue apparatus is then rolled off of the elevator, transporting the cart from the elevator and from above the automatic guided vehicle, and the cart is rolled from the support surface of the rails of the rescue apparatus. The rescue apparatus is then, again, rolled onto the elevator with the lift rails in their lowered position and embracing the automatic guided vehicle. The rails are then raised until the automatic guided vehicle is lifted and supported by the support surface of the automatic guided vehicle lift tabs. The rescue apparatus is then rolled off the elevator together with the automatic guided vehicle.

Alternatively, the rescue apparatus may be rolled into a position in which the rails are lowered and embracing the automatic guided vehicle on the elevator and the rails raised to an elevation at which the wheels of the materials by cart are supported by the upper support surface of the rails and the base of the automatic guided vehicle is supported by the supporting surface of the automatic guided vehicle lift tabs. The rescue apparatus may then be rolled from the elevator transporting both the material and supply cart and the automatic guided vehicle from the elevator. The lift rails may then be lowered to a position in which the supporting surface of the automatic guided vehicle lift tabs no longer support the base of the automatic guided vehicle but the wheels of the material and supply cart remain supported by the support surface of the lift rails. The rescue apparatus may then be backed away from the automatic guided vehicle to remove the material and supply cart from above the automatic guided vehicle and the material and supply cart rolled from the support surface of lift rails of the forklift to free the cart from the disabled vehicle and allow an operational automatic guided vehicle to pick up and transport the cart through the material handling system.

Additional features and advantages of the rescue method and apparatus of the present invention will become evident upon perusal of the detailed description together with the drawings in which:

BRIEF DESCRIPTION OF THE DRAWINGS

FIG. 1 is an isometric pictorial view of the rescue apparatus of the present invention with its lift rails lowered and about to be positioned for rescue of an automatic guided vehicle.

FIG. 2 is a front elevation view showing the initial position of the lift rails of the rescue device prior to rescue of an automatic guided vehicle with a material and supply cart supported piggyback thereon.

FIG. 3 is a front elevation view showing the lift rails of the rescue apparatus in a position in which the wheels of the material and supply cart are supported by the support surface of the lift rails but the base of the automatic guided vehicle is not supported by the automatic guided vehicle lift tabs.

FIG. 4 is a front elevation view showing the position of the lift rails of the rescue apparatus when the wheels of the material and supply cart are supported by the support surface of the lift rails and the base of the automatic guided vehicle is supported by the support surface of the automatic guided vehicle lift tabs.

FIG. 5 is a side elevation view of the rescue apparatus and an automatic guided vehicle with a material and supply cart supported piggyback thereon positioned as in FIG. 1.

FIGS. 6 (a)-(c) are sectional views of a lift rail of the rescue apparatus at the point of attachment of an automatic guided vehicle lift tab.

DETAILED DESCRIPTION OF THE INVENTION

Exemplary automatic guided vehicle rescue apparatus 50 comprising a preferred embodiment of the present invention is illustrated in FIG. 1 and comprises a wheeled forklift-type pallet lift 52 such as are commonly used in warehouse operations for moving pallets loaded with goods and are familiar to those knowledgeable in the art. Pallet lift 52 includes lift body 53, wheels 54, and lift rails 56. Tongue 58 is hinged at the rear of lift body 53, at 59, to pivot in a vertical plane, and extends to handle 60. Pallet lift 52 of rescue apparatus 50 comprising the exemplary preferred embodiment includes hydraulic jacking apparatus to raise and lower rails 56, together with any loads resting upon them, in response to pumping of tongue 58 about hinge point 59 and squeezing of release trigger 61, respectively. Pallet lift 52, together with loads placed thereon, may be rolled about by pushing or towing on handle 60 and tongue 58 and, may be steered by swinging handle 60 and tongue 58 from side-to-side.

Exemplary apparatus 50 includes automatic guided vehicle lifting tabs 70 which are affixed to rails 56 and extend inward between the rails. Cart ramps 64 are affixed to distal ends of rails 56.

Exemplary rescue apparatus 50, comprising the exemplary embodiment is provided with a loading cable 80. As may best be seen in FIG. 5, cable 80 is provided with hook 81 which cooperates with eye 82, to releasably attach cable 80 to tongue 58, and hooks 84, to releasably attach cable 80 to cart bumper rail 86.

Lift rails 56 of pallet lift 52 of exemplary apparatus 50 are spaced apart a distance such that automatic guided vehicle 30 may just fit between them. Automatic guided vehicle lift tabs 70 are positioned such that their upper support surface lies below the upper support surface of rails 56 by a distance greater than the distance base 34 of automatic guided vehicle 30 lies beneath wheels 26 of cart 20 when cart 20 is in the lifted piggyback transport position, as seen in FIG. 2. Automatic guided vehicle lift tabs 70 may be bolted or welded to lift rails 56, as shown FIGS. 6(a) and 6(b) respectively, or may be attached to lift rail collars 72 which slidably surround lift rails 56 to allow lift tab 70 to be removed when pallet lift 52 is not being used for automatic guided vehicle rescue, as shown in FIG. 6 (c).

When automatic guided vehicle 30, which has become stranded on an elevator during piggyback transport of material and supply cart 20, is to be rescued, rescue apparatus 50 is rolled to the elevator door and positioned in the manner illustrated in FIG. 1 with lift rails 56 in a fully lowered position to either side of and in alignment with automatic guided vehicle 30. Rescue apparatus 50 is then rolled onto the elevator with lift rails 56 lying on either side of automatic guided vehicle 30 and beneath wheels 26 of cart 20, as illustrated in FIG. 2.

Loading cable 80 may be utilized to assist an operator in rolling rescue apparatus 50 to this position. Tongue 58 and handle 60 are rotated to a vertical or near vertical position. Then, cable hook 81 is hooked in eye 82 on tongue 58 and hooks 84 are hooked on cart bumper rail 86. Handle 60 may then be pulled away from automatic guided vehicle 30 and cart 20 to lever pallet lift 52 beneath cart 20.

Once rescue apparatus 50 has been rolled onto the elevator and positioned as illustrated in FIG. 2 with rails 56 beneath wheels 26 of cart 20, the rails may be raised to a position such as that illustrated in FIG. 3, in which wheels 26 are supported by rail support surface 57 and base 34 of automatic guided vehicle 30 is supported by support surface 74 of lift tabs 70. Rescue apparatus 50 may then be rolled from the elevator to remove both material and supply cart 20 and automatic guided vehicle 30. Automatic guided vehicle 30 and cart 20 may be deposited together at a desired location by rolling rescue apparatus 50 to the location, lowering lift rails 56 and rolling rescue apparatus 50 from beneath cart 20 and automatic guided vehicle 30.

If, after removal from the elevator, it is desired to deposit cart 20 at a first location for subsequent pick up by another automatic guided vehicle in the material handling system and then to transport automatic guided vehicle 30 to a different location for repair, rescue apparatus 50 may be rolled, with cart 20 and automatic guided vehicle 30 onboard, to the location where cart 20 is to be deposited and lift rails 56 lowered to the position illustrated in FIG. 4, in which support surfaces 74 of lift tabs 70 no longer contact base 34 of automatic guided vehicle 30, and rescue apparatus 50 rolled backward to carry cart 20 upon rails 56 from its position above automatic guided vehicle 30. Transport cart 20 may then be transported to the desired position for pick up by another automatic guided vehicle. At the desired location rails 56 are lowered and cart 20 rolled from support surfaces 56 and down end ramps 64.

In a similar manner, rescue apparatus 50 allows cart 20 and automatic guided vehicle 30 to be removed from the elevator one at a time. This may be desirable where material and supply cart 20 is heavily laden and the combined weight of cart 20 and automatic guided vehicle 30 would make the manual rolling of rescue apparatus 50 difficult or where support surfaces may be damaged by the combined weight of cart 30 and automatic guided vehicle 30, where the deposit points for cart 20 and vehicle 30 are widely disparate, or where it is desired to use two rescue apparatus to transport cart 20 an automatic guided vehicle 30, respectively, to different locations.

When it is desired to remove cart 20 and automatic guided vehicle 30 from the elevator separately, rescue apparatus 50 is first rolled onto the elevator and positioned as discussed previously and as illustrated in FIG. 2. Rails 56 are then elevated to the position illustrated in FIG. 4, at which wheels 26 of cart 20 are supported by support surface 57 of rails 56 but support surfaces 74 of lift tabs 70 remain beneath and clear of base 34 of automatic guided vehicle 30. With the rails at this elevation, rescue apparatus 50 is rolled from the elevator to remove cart 20 while leaving automatic guided vehicle 30 on the elevator. Automatic guided vehicle 30 may later be removed by again rolling rescue apparatus 50 onto the elevator to the position illustrated in FIG. 2 and raising lift rails 56 to a position in which base 34 of automatic guided vehicle 30 is supported by support surface 74 of lift tab 70, with wheels 38 of the automatic guided vehicle clear of the support surface, and then rolling rescue apparatus 50 from the elevator to remove automatic guided vehicle 30.

While the method of the present invention for rescuing an automatic guided vehicle from an elevator has been described together with an automatic guided vehicle rescue apparatus comprising a preferred embodiment of the present invention, it will be understood, of course, that the invention is not limited to that embodiment. Modification may be made by those skilled in the art, particularly in view of the foregoing teachings. For example, the rescue apparatus may include pallet lift devices incorporating motor driven wheels and jacking means or a power winch may be provided to assist in positioning the rescue apparatus on the elevator. It is, therefore, contemplated by the appended claims to cover any such modification which incorporates the essential features of the invention or which encompasses the spirit and scope of the invention.

I claim:

1. A method for removing an automatic guided vehicle and piggyback cart from an elevator, the cart having a cabinet and legs extending downward from a bottom of the cabinet to wheels at leg base ends, the automatic guided vehicle sized and adapted to fit closely between the legs and having a lift to lift the cart by the cabinet bottom such that the automatic guided vehicle can transport the cart with the legs extending downward along sides of the automatic guided vehicle, the method comprising the steps of:

A. providing a pallet lift having wheels, generally horizontal, parallel lift rails projecting longitudinally forward to distal ends, and separated by a transverse distance such that a width of the automatic guided vehicle may just fit between the rails;
   B. providing a jack system for raising and lowering the rails and loads supported thereby;
   C. attaching inward extending opposing tabs at a plurality of positions along a longitudinal length of the lift rails;
   D. rolling the pallet lift onto the elevator to a position in which the automatic guided vehicle is between the lift rails and the rails are beneath the wheels of the cart;
   E. raising the rails to an elevation at which the wheels are supported by an upper surface of the rails but the tabs are clear of a base of the automatic guided vehicle;
   F. rolling the pallet lift off of the elevator, thereby transporting the cart from the elevator and from above the automatic guided vehicle;
   G. rolling the cart from the rails of the pallet lift;
   H. rolling the pallet lift onto the elevator to a position in which the automatic guided vehicle is between the lift rails;
   I. raising the rails until the automatic guided vehicle is lifted and supported by the inward extending tabs; and,
   J. rolling the pallet lift off of the elevator thereby transporting the automatic guided vehicle from the elevator.

2. The method of claim 1 further comprising the step of attaching wheel ramps to the distal ends of the rails.

3. A method for removing an automatic guided vehicle and piggyback cart from an elevator, the cart having a cabinet and legs extending downward from a bottom of the cabinet to wheels at leg base ends, the automatic guided vehicle sized and adopted to fit closely between the legs and provided with a lift to lift the cart by the cabinet bottom such that the automatic guided vehicle can transport the cart with the legs extending downward along sides of the automatic guided vehicle, the method comprising the steps of:

A. providing a pallet lift having wheels, generally horizontal, parallel lift rails projecting longitudinally forward to distal ends, and separated by a transverse distance such that a width of the automatic guided vehicle may just fit between the rails;
   B. providing a jack system for raising and lowering the rails and loads supported thereby;
   C. attaching inward extending opposing tabs at a plurality of positions along a longitudinal length of the lift rails;
   D. rolling the pallet lift onto the elevator to a position in which the automatic guided vehicle is between the lift rails and the rails are beneath the wheels of the cart;
   E. raising the rails until the wheels are supported by an upper surface of the rails and the automatic guided vehicle is lifted and supported by the inward extending tabs;
   F. rolling the pallet lift off of the elevator thereby transporting the automatic guided vehicle and piggyback cart from the elevator.

4. A method for removing an automatic guided vehicle and piggyback cart from an elevator, the cart having a cabinet and legs extending downward from a bottom of the cabinet to wheels at leg base ends, the automatic guided vehicle sized and adopted to fit closely between the legs and having a lift to lift the cart by the cabinet bottom such that the automatic guided vehicle can transport the cart with the legs extending downward along sides of the automatic guided vehicle, the method comprising the steps of:

A. providing a pallet lift having wheels, generally horizontal, parallel lift rails projecting longitudinally forward to distal ends, and separated by a transverse distance such that a width of the automatic guided vehicle may just fit between the rails;

B. providing a jack system for raising and lowering the rails and loads supported thereby;

C. attaching inward extending opposing tabs at a plurality of positions along a longitudinal length of the lift rails;

D. rolling the pallet lift onto the elevator to a position in which the automatic guided vehicle is between the lift rails and the rails are beneath the wheels of the cart;

E. attaching a first end of a tensile member to the cart and a second end of the tensile member to the tongue at a point between the base end and the distal end;

F. rotating the tongue about its hinge to draw the pallet lift beneath the cart;

G. raising the rails until the wheels are supported by an upper surface of the rails but the tabs are clear of the automatic guided vehicle;

H. rolling the pallet lift off of the elevator, thereby transporting the cart from the elevator and from above the automatic guided vehicle;

I. rolling the cart from the rails of the pallet lift;

J. rolling the pallet lift onto the elevator to a position in which the automatic guided vehicle is between the lift rails;

K. attaching a first end of the tensile member to the cart and a second end of the tensile member to the tongue at a point between the base end and the distal end;

L. rotating the tongue about its hinge to draw the pallet lift beneath the cart;

M. raising the rails until the automatic guided vehicle is lifted and supported by the inward extending tabs; and, N. rolling the pallet lift off of the elevator thereby transporting the automatically guided vehicle from the elevator.

5. An automatic guided vehicle rescue apparatus comprising:

a pallet lift including a lift body, wheels for rolling upon a supporting surface, and first and second elongate lift rails each of said rails having an upper, generally horizontal, support surface and extending horizontally forward from said lift body in fixed, set apart, parallel relation to distal ends and having opposing parallel inner surfaces set apart a distance to allow said rails to embrace an automatic guided vehicle therebetween;

jack means for raising and lowering the rails and a load supported thereby; and, first and second automatic guided vehicle lifting tabs extending inward of said inner surface of said first and second lift rails, respectively, said first and second lift tabs having an upper support surface for lifting a base of an automatic guided vehicle, said support surface of said first and second lifting tab lying beneath the support surface of said first and second rail, respectively, by a distance greater than a distance the base of an automatic guided vehicle lies beneath a wheel of a cart being carried piggyback on the automatic guided vehicle.

6. The apparatus of claim 5 in which said pallet lift has a tongue extending rearward from said lift body, the tongue hinged at a base end such that the tongue may be rotated in a vertical plane about the base end and having a handle attached to a distal end, further comprising:

first and second ramps attached to the distal ends of said first and second rail, said first and second ramp having an upper support surface extending forward and downward from the support surface of the first and second rail, respectively.

7. The apparatus of claim 6, further comprising, an elongate tension member, said tension member including first attachment means at a first end for attaching said first tension member end to said tongue and second attachment means at a second end for attaching said second end of said tension member to a material supply cart.

8. The apparatus of claim 6, further comprising, an elongate tension member, said tension member including first attachment means at a first end for attaching said first tension member end to said tongue and second attachment means at a second end for attaching said second end of said tension member to an automatic guided vehicle.

* * * * *